(12) United States Patent
Di Fabbrizio et al.

(10) Patent No.: US 9,483,730 B2
(45) Date of Patent: Nov. 1, 2016

(54) HYBRID REVIEW SYNTHESIS

(71) Applicant: AT&T Intellectual Property I, L.P., Atlanta, GA (US)

(72) Inventors: Giuseppe Di Fabbrizio, Florham Park, NJ (US); Amanda Joy Stent, Chatham, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 234 days.

(21) Appl. No.: 13/707,978

(22) Filed: Dec. 7, 2012

(65) Prior Publication Data

US 2014/0164302 A1    Jun. 12, 2014

(51) Int. Cl.
G06F 15/00    (2006.01)
G06F 15/18    (2006.01)
G06N 5/02     (2006.01)
G06Q 30/06    (2012.01)

(52) U.S. Cl.
CPC ............ *G06N 5/02* (2013.01); *G06Q 30/0631* (2013.01)

(58) Field of Classification Search
CPC ... H04W 4/003; H04W 4/021; H04W 4/206; G06Q 10/00; G06Q 30/0203; G06Q 30/02; G06F 17/2745; G06F 17/2765; G06F 17/30616
See application file for complete search history.

(56) References Cited

U.S. PATENT DOCUMENTS

| | | | |
|---|---|---|---|
| 7,769,759 B1 | 8/2010 | Gartung et al. | |
| 7,836,001 B2 | 11/2010 | Ducheneaut et al. | |
| 8,117,207 B2 | 2/2012 | Mushtaq et al. | |
| 8,255,267 B2 * | 8/2012 | Breiter | G06Q 10/00 705/14.42 |
| 2002/0161664 A1 * | 10/2002 | Shaya et al. | 705/26 |
| 2002/0188464 A1 * | 12/2002 | Hodgins | G06Q 30/0203 705/1.1 |
| 2006/0111962 A1 * | 5/2006 | Holsinger | G06Q 30/02 705/7.32 |
| 2009/0150920 A1 * | 6/2009 | Jones | 725/23 |
| 2009/0177504 A1 * | 7/2009 | Bartel | 705/6 |
| 2011/0191141 A1 * | 8/2011 | Thompson et al. | 705/7.32 |
| 2011/0251973 A1 | 10/2011 | Chen et al. | |
| 2011/0282823 A1 * | 11/2011 | Yahia et al. | 706/50 |
| 2011/0282952 A1 * | 11/2011 | Song | 709/206 |
| 2012/0144413 A1 * | 6/2012 | Wang et al. | 725/13 |
| 2012/0166354 A1 | 6/2012 | Bank et al. | |
| 2012/0252504 A1 * | 10/2012 | Firstenberg et al. | 455/457 |

OTHER PUBLICATIONS

"Rotten Tomatoes: Sentiment Classification in Movie Reviews": Liang, 2006, Stanford University.*

(Continued)

*Primary Examiner* — Kakali Chaki
*Assistant Examiner* — Peter Coughlan
(74) *Attorney, Agent, or Firm* — Hoffmann & Baron, LLP

(57) ABSTRACT

A method of generating a summary review of an entity from a set of reviews includes generating a distribution and determining a polarity of the distribution associated with a plurality of aspect ratings based on the set of reviews. The set of reviews are associated with the entity, and the plurality of aspect ratings are associated with an aspect, or feature, of the entity. The method includes selecting an opinion correlated with the polarity from the set of reviews, and generating the summary review, the summary review comprising: a summary statement based on the distribution and the polarity; and the opinion. An apparatus and computer-readable device are also disclosed.

17 Claims, 5 Drawing Sheets

(56) References Cited

OTHER PUBLICATIONS

'Good Grief, I Can Speak It! Preliminary Experiments in Audio Restaurant Reviews': Polifroni, 2010, IEEE, 978-1-4244-7903, pp. 91-96.*

'Rotten Tometoes' [retrieved on Sep. 15, 2014]. Retrieved from the Internet <URL:http://en.wikipedia.org/wiki/Rotten_tomatoes>.*

Mehryar Mohri, et al, Weighted Automata in Text and Speech Processing, pp. 46-50, ECAI 96 12th European Conference on Artificial Intelligence, Published 1996 by John Wiley & Sons, Ltd.

* cited by examiner

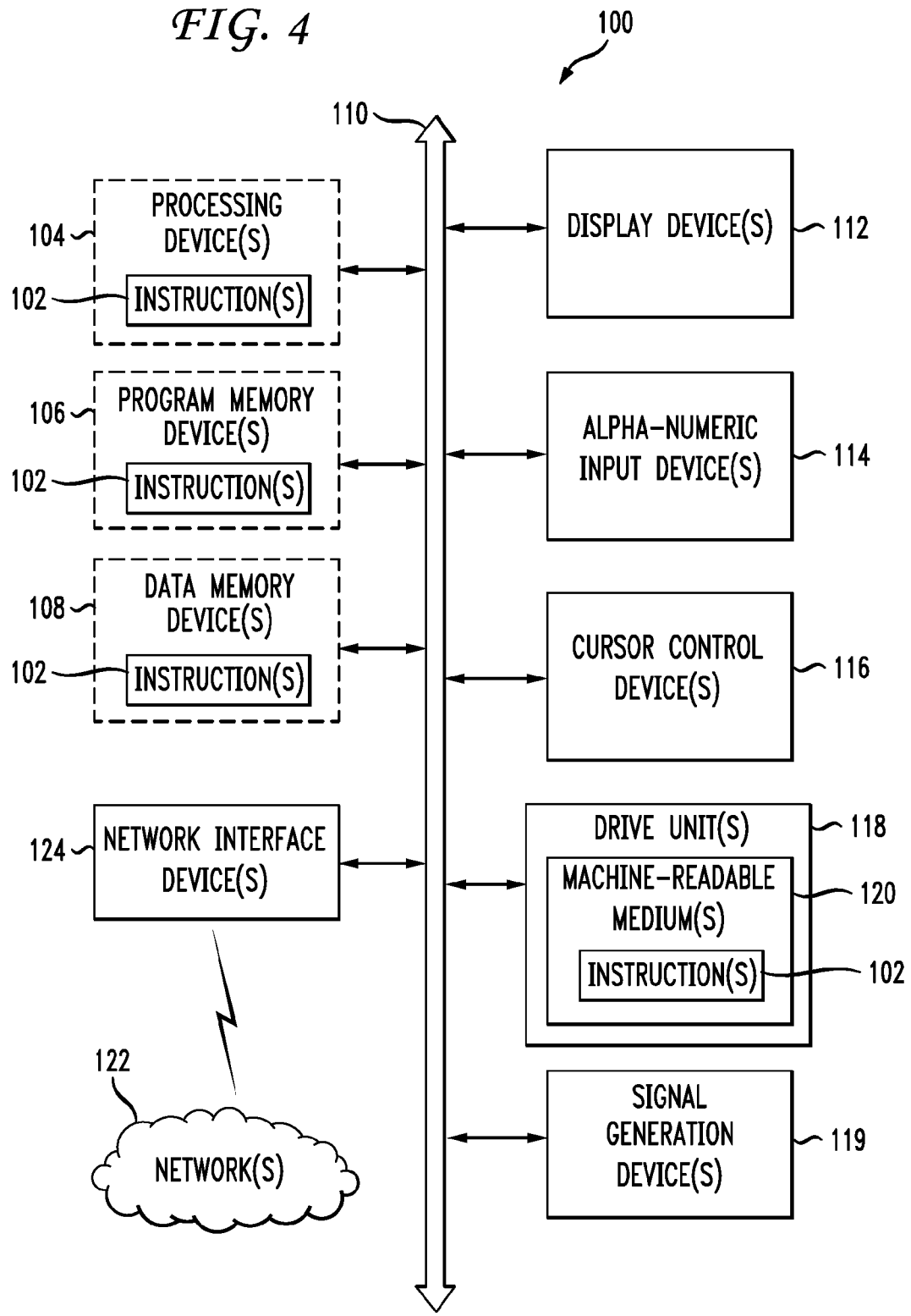

HYBRID REVIEW SYNTHESIS

BACKGROUND

1. Technical Field

The present disclosure relates to presentation of product and service reviews, and, more specifically, to automatic generation of summaries of product and service reviews for presentation.

2. Related Art

Recent years have seen a dramatic increase in the use of networked mobile devices for daily life tasks such as finding and purchasing products and services. This kind of task involves search (to retrieve matching entities or businesses) and selection (of retrieved results). Selection decisions are increasingly made on the basis of surveying online reviews, which are abundantly available online. However, even from traditional PC interfaces, gathering information relevant to shoppers from product and service search results involves a significant amount of time reading reviews and weeding out extraneous information, and mobile users lack time and display space for leisurely perusal of hundreds (or thousands) of reviews for dozens of search results. While recent work in multi-document summarization has attempted to some degree to address this challenge, many questions about extracting and aggregating opinions remain unanswered.

Reviews can be described as textual opinions about a single product, e.g., consumer goods such as digital cameras, DVD players, or books; or about a service like lodging in a hotel or dining in a restaurant. Because the product or service can have several ratable aspects (sometimes referred to also as topics or features), any one review can provide evaluative text about one or more aspects. Accordingly, a review can be viewed as a set of aspects, each with an associated rating for a particular entity, where an entity refers to the particular type or brand of product, or particular restaurant, hotel, and so on providing services.

Ratings define the polarity (favorable, unfavorable, neutral) and strength of polarity (5 of 5 being strongly favorable, for example, 4 of 5 being weakly unfavorable, 3 of 5 being neutral, for example) of opinions and are preferably correlated with a range of integer values, which can be visualized as a number of symbols corresponding to the integer value. Typically, ratings are entered by reviewers as a number of stars corresponding to an integer number between 1 and 5, five (5) stars indicating a strong positive or most favorable opinion, one (1) star indicating a strong negative (unfavorable) opinion, and three (3) stars indicating a neutral opinion. The reviews can be entered, for example, by various authors, through a blog, a website, an app, and so-on, and retrieved according to one of various methods known in the art.

There are three main approaches that have been used to synthesize reviews. The first is to summarize the reviews graphically, while the other two produce textual review summaries. One method of forming a textural review is by extractive summarization. Current extractive summarization involves the selection and knitting together of text fragments from input reviews. The other is abstractive summarization, which involves the generation of new text sentences to express information about the range, polarity and strength of the opinions expressed in the input reviews. Neither type of textual summarization technique, however, currently produces user-targeted, concise, and reliable summary reviews.

The mobile device presents particular new challenges for both search and review browsing services:

Screen size—Mobile devices have relatively small displays and limited navigation capabilities.

Time—Mobile users are often on-the-move with limited time to refine search criteria or select relevant information from a long list of results and would benefit from information being presented that is targeted to the user's goals.

Location—Mobile users are highly focused on executing geographically local plans such as finding restaurants, entertainment events, or retail stores. Again, this presents a need for targeted results.

Personalization—For mobile users, personal data (e.g., search and purchasing histories) can be used to improve the precision of search results and the informativeness of reviews.

Although constrained by the same factors, typically, mobile search and mobile review browsing are treated as different tasks using a combination of poorly integrated algorithms. This leads to inefficiencies and decreases user satisfaction.

For example, imagine that a consumer wants to buy a particular brand of shoes. The consumer would first use a local mobile search engine to find nearby shoe stores. The search engine might re-rank search results by using geographic information about the current user's location—or an explicitly requested location—and, optionally, re-score the final results based on domain knowledge and/or the user's search history. Once in the store, the user may use a separate internet search to find and browse online reviews and ratings for particular types of shoes. Opinion mining and sentiment analysis methods can be applied to extract the targets, and the relative polarity (e.g., positive, negative, or neutral) of the opinions expressed in the reviews. Lastly, the user must synthesize (or summarize) all the facts, opinions, and ratings by reading the reviews from the previous step to find the most desirable option, depending on the user's particular tastes.

While some methods exist for performing the first two steps in this process (search and sentiment analysis), there are no known methods for summarization of evaluative text of reviews (e.g., opinion or sentiment-laden text) in a targeted, concise, reliable, and readable form, particularly for use on a small mobile device.

For example, "Have2eat" is a popular restaurant search and reviewing application available for iPhone and Android-based devices. During a search, Have2eat uses geo-location information (from the GPS device or explicitly entered by the user) to produce a list of matching restaurants sorted by distance and located within a specific radius from the originating location. During browsing of search results, when restaurant reviews are available, a compact one-screen digest displays a listing of the reviews posted on the web by other customers. Customers can expand to read a full review page and can also enter their own ratings, comments and feedback. Review summaries can be visualized on the mobile screen in the form of:

a graphical summary by thumbs-up (positive reviews) and thumbs-down (negative reviews) for different aspects of the restaurant, where the summary finding is obtained by simply counting how many reviews were positive and how many were negative; and textually by a few sentences selected from review texts that best summarize the opinions about various aspects of the restaurant expressed in the reviews.

There are other similar applications commercially available for mobile platforms, however, most of them are only focused on the search task. When available, reviews, for example, restaurant reviews, are simply visualized as a contiguous list of text snippets with the overall experience rating.

SUMMARY

Features of the disclosure will become apparent from the following detailed description considered in conjunction with the accompanying drawings. It is to be understood, however, that the drawings are designed as an illustration only and not as a definition of the limits of this disclosure.

The disclosure is directed to a method of generating a summary review associated with an entity. The method includes: generating, using a processing device, a distribution and determining a polarity of the distribution associated with a plurality of aspect ratings based on a set of reviews, the set of reviews being associated with the entity, the plurality of aspect ratings being associated with an aspect of the entity, the aspect representing a feature associated with the entity; selecting, using the processing device, an opinion from the set of reviews, the opinion being correlated with the polarity; and generating, using the processing device, the summary review, the summary review comprising a summary statement and the opinion, the summary statement being based on the distribution and the polarity.

The method may include extracting a quotable sentence comprising the opinion from the set of reviews and including the quotable sentence in the summary review.

The method may also include: defining a plurality of aspects representing a plurality of features associated with the entity, generating the distribution and determining the polarity of the distribution associated with each of the plurality of aspects, selecting a plurality of opinions from the set of reviews, each of the plurality of opinions being correlated with the polarity associated with one of the plurality of aspects, the summary review comprising the plurality of the opinions.

The plurality of opinions may be presented in a predetermined order, the predetermined order being based on a strength of the polarity associated with each of the plurality of aspects.

The method may further include calculating an overall rating associated with the plurality of aspects based on the plurality of opinions, the summary review including a statement representing the overall rating associated with the entity.

The method may also include: generating the summary review in response to an inquiry from a user, retrieving metadata associated with each of the set of reviews, and calculating a confidence score associated with each of the set of reviews based on the metadata, the opinion selected from the set of reviews being associated with a high confidence score, the high confidence score indicating the opinion includes information targeted to the user.

The metadata may include a time stamp to indicate timeliness, geographic location, and authorship information associated with the opinion.

The disclosure is also directed to a computer-readable device to store instructions that, when executed by a processing device, cause the processing device to perform operations including: generating a distribution and determining a polarity of the distribution associated with a plurality of aspect ratings based on a set of reviews, the set of reviews being associated with an entity, the plurality of aspect ratings being associated with an aspect of the entity, the aspect representing a feature associated with the entity; selecting an opinion from the set of reviews, the opinion being correlated with the polarity; and generating a summary review, the summary review comprising a summary statement and the opinion, the summary statement being based on the distribution and the polarity.

The operations may also include extracting a quotable sentence from the set of reviews, the summary review comprising the quotable sentence, the quotable sentence comprising the opinion.

The operations may also include: generating a summary review associated with the entity by defining a plurality of aspects representing a plurality of features associated with the entity; generating the distribution and determining the polarity of the distribution curve associated with each of the plurality of aspects; and selecting a plurality of opinions from the set of reviews, each of the plurality of opinions being correlated with the polarity associated with one of the plurality of aspects, the summary review comprising the plurality of the opinions.

The operations may also include presenting the plurality of opinions in a predetermined order, the predetermined order being based on a strength of the polarity associated with each of the plurality of aspects.

The operations may also include generating the summary review in response to an inquiry from a user; retrieving metadata associated with each of the set of reviews; and calculating a confidence score associated with each of the set of reviews based on the metadata, the opinion selected from the set of reviews being associated with a high confidence score, the high confidence score indicating the opinion includes information targeted to the user.

The metadata may include a time stamp to indicate timeliness, geographic location, and authorship information associated with the opinion.

The operations may further include generating the summary review by calculating an overall rating associated with the plurality of aspects based on the plurality of opinions, the summary review including a statement representing the overall rating associated with the entity.

The disclosure is also directed to an apparatus to generate a summary review associated with an entity. The apparatus includes a processing device, and memory to store instructions that, when executed by the processing device, cause the processing device to perform operations comprising: generating a distribution and a polarity of the distribution associated with a plurality of aspect ratings based on a set of reviews, the set of reviews being associated with the entity, the plurality of aspect ratings being associated with an aspect of the entity, the aspect representing a feature associated with the entity; selecting an opinion from the set of reviews, the opinion being correlated with the polarity; and generating the summary review, the summary review comprising a summary statement and the opinion, the summary statement being based on the distribution and the polarity.

The summary review may include a quotable sentence extracted from the set of reviews, the quotable sentence comprising the opinion.

The apparatus may include memory to store instructions that, when executed by the processing device, also cause the processing device to perform operations comprising: generating the distribution and determining the polarity of the distribution associated with each of a plurality of aspects representing a plurality of features associated with the entity; and selecting a plurality of opinions from the set of reviews, each of the plurality of opinions being correlated with the polarity associated with one of the plurality of aspects, the summary review comprising the plurality of the opinions.

The operations may also include presenting the plurality of opinions in a predetermined order, the predetermined order being based on a strength of the polarity associated with each of the plurality of aspects.

The operations may also comprise: generating the summary review in response to an inquiry from a user; retrieving metadata associated with each of the set of reviews; calculating a confidence score associated with each of the set of reviews based on the metadata; and selecting the opinion that is associated with a high confidence score from the set of reviews, the high confidence score indicating the opinion includes information targeted to the user.

The operations may also comprise calculating an overall rating associated with the plurality of aspects based on the plurality of opinions, the summary review including a statement representing the overall rating associated with the entity.

Other features of the present disclosure will become apparent from the following detailed description considered in conjunction with the accompanying drawings. It is to be understood, however, that the drawings are designed as an illustration only and not as a definition of the limits of the claims.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the following detailed description in conjunction with the accompanying drawings.

FIG. 4 is a block diagram showing at least a portion of an exemplary machine in the form of a computing system configured to perform methods according to one or more embodiments.

DETAILED DESCRIPTION

Figure 1:
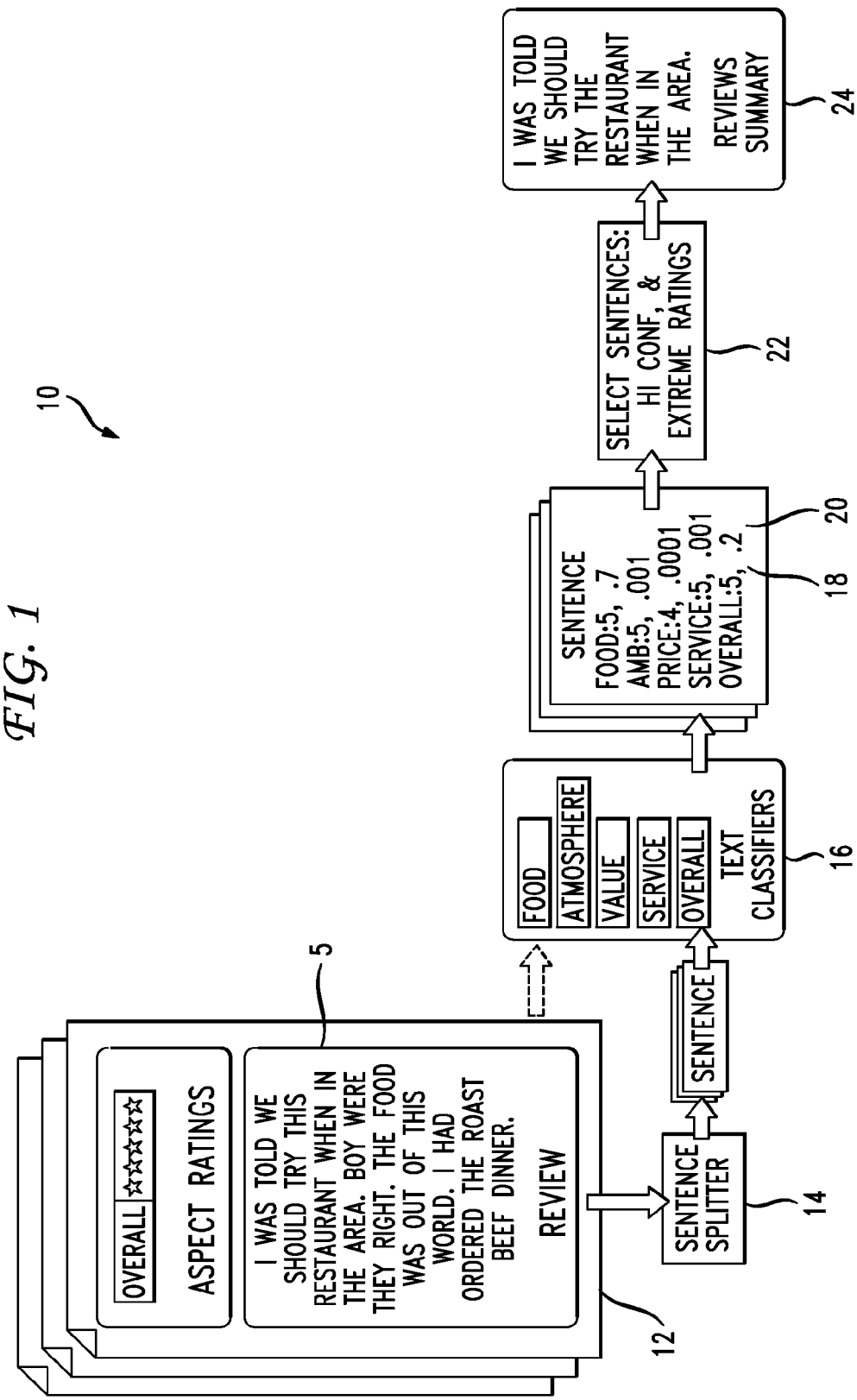
FIG. 1 is a schematic representation of an embodiment of a method for generating a summary review using extractive summarization techniques of the present disclosure.

The present disclosure is directed to a method, apparatus, and computer-readable device for generating user-targeted, concise review summarization. Though particular embodiments for generating user-targeted summaries are described which employ extractive and hybrid techniques, the present disclosure encompasses methods for generating user-targeted and concise summaries using any appropriate extractive, abstractive, or hybrid technique, by assigning confidence scores to the reviews retrieved, as described herein, in order to prepare and select content or sentences for generation of the summaries.

A "review" as used herein is a textual opinion about a single product, e.g., consumer goods such as digital cameras, DVD players, or books; or about a service like lodging in a hotel or dining in a restaurant.

A "summary review" is a textual summary based on a set of reviews.

An "aspect" is a ratable "feature" of the product or service being reviewed. For example, aspects of restaurants being rated by reviewers can include food, price, ambience, service.

A "rating" refers to a valuation of the opinion in the review on a predetermined scale. For example, a rating can be an integer value 1 to 5, with 5 being most favorable, 1 being least favorable. An "aspect rating" is a rating of a particular aspect; an "overall rating" is a rating of the entity overall.

The term "entity" is used to refer the particular type or brand of product, or particular restaurant, hotel, and so on providing services.

A "distribution" and "distribution curve" are used as those terms are known in the art to describe a grouping of data into classes or categories according to the frequency of occurrence of each successive value or ranges of such values, which can be represented in a graph of a frequency distribution. For example, a distribution of aspect ratings for a particular aspect, where each aspect rating is associated with an opinion in a review regarding the particular aspect, can be determined and represented as a graph of integer values of the aspect ratings from 1-5, plotted on an x-axis of an (x,y) coordinate system and the number of reviews associated with each aspect rating, plotted on a y-axis of the (x,y) coordinate system.

The term "polarity" is used to indicate a shape of the distribution or distribution curve; in other words, whether most of aspect ratings are: positive, or favorable (e.g., a rating of 4 or 5 out of 5); negative, or unfavorable (e.g., a rating of 1 or 2 out of 5); neutral (3 out of 5); or undeterminable. If the distribution is bimodal, there can be both a large number of aspect ratings that are favorable and a large number of aspect ratings that are unfavorable, with no clear majority, so that there will be both a positive and a negative polarity associated with the distribution. If a distribution is uniform, the polarity is undetermined indicating that the opinions associated with the aspect ratings were mixed.

The term "demographic" is used to refer to data that is statistically socio-economic in nature, such as population, age, race, sex, marital status, religion, birth rate, death rate, average size of a family, average age at marriage, income, education and employment, which represent specific geographic locations and are often associated with time.

In particular embodiments, the review summarization is generated using a hybrid approach, which combines aspects of abstractive and extractive summarization methods, to extract relevant opinions and relative ratings from text documents.

Automatic summarization of evaluative texts, provided in the form of reviews, can be described as having two components: sentiment analysis and extraction; and summarization.

According to the various embodiments of the present disclosure, a set of reviews from various authors about a particular entity (particular store, restaurant, brand of product, for example) related to a product or service are retrieved for a number of entries according to methods known in the art. Each review is then preferably deconstructed using natural language interpreters. Evaluative language presents specific linguistic characteristics that are usually missed in traditional natural language processing approaches. For each entity, a sentiment analysis can be generated according to various methods known in the art. In general terms, sentiment analysis includes the analysis of sentences of a review to identify various aspects and then to rate the aspects described in each sentence. As one of skill in the art will appreciate, such sentiment analysis techniques for evaluative texts must identify the linguistic elements realizing sentiment, their target domain-relevant aspects, and their semantic orientation in the context of the document. These elements are often lexical, ranging from single words (e.g., fantastic, dreadful, good) to more complex syntax structures (e.g., "to put it mildly," "stand in awe," "the most disappointing place that I have stayed"). As described, for example, in Wiebe, J., Wilson, T., Bruce, R., Bell, M., Martin, M., "Learning subjective language," *Computational Linguistics* 30(3), 277-308 (2004) (hereinafter "Wiebe et al."), three types of sentiment clues are: (1) hapax legomena—unique words appearing only once in the text; (2) collocations—word ngrams frequently occurring in subjective sentences; and (3) adjectives and verbs—extracted by clustering according to a distribution similarity criterion. Additionally, the contexts where the clues appear in the sentences play a key role in determining actual polarity of the opinions being expressed. Additional clues—contextual value shifters—that modify the positive or negative contributions of other clues have also been identified. For example, consider the positive word efficient; when modified by the intensifier rather, the resulting rather efficient is a less strongly positive expression.

While many of the embodiments are described herein in regard to evaluating reviews for one particular entity, it should be understood that the scope of the disclosure extends to summarizing different sets of reviews of different entities, such that summary reviews can be generated for a number of entities. Accordingly, the summary reviews for various entities can be presented to a user for direct comparison, for summaries directed to more than one entity, and any other suitable presentation.

Referring to FIG. 1, in one embodiment, an extractive summarization method of reviews 10 is provided to generate user-targeted, concise summary reviews. To summarize reviews retrieved 5 from a user-initiated search of restaurants, for example, the method 10 includes training predictive models during a sentiment analysis for each aspect 12. The sentiment analysis can be any suitable analysis known in the art, such as a multi-rating multi-aspect ("MRMA") model to identify the various aspects described in each review, and predict a rating for each aspect from the evaluative text of the review. The review text is then split into sentences 14, for example, by using a statistical sentence splitter trained on email data and using n-gram and word part-of-speech features.

Using the predictive models, and iterating over the restaurant listings, each sentence in each review is classified according to aspect 16 and a rating for that aspect is determined 18 along with a confidence score attributable to the review 20. In this example, five (5) aspect-specific ratings and confidence scores for those ratings are obtained. A few sentences that have extreme ratings and high confidence are then selected 22 for presentation as summary text 24 in a review summary.

To generate the confidence scores, in addition to the evaluative texts of the reviews, metadata and other information is preferably retrieved, for example, in the form of time and/or geographical stamps and other data typically associated with user-submitted reviews generated from smart phones and other mobile devices, and from on-line social network applications. The confidence score is determined based on machine learning methods that keep into consideration a large number of features including syntactic features (n-grams, parts of speech, shallow parsing tags) and, for example, meta-information about the review/reviewer. For example, the trustworthiness/reliability of the reviewer, as well as the timeliness of the review at the time the search was generated, and the demographic similarity of the reviewer to the target user or (social) relationships between the reviewers and the target user can be used to generate the confidence scores. Accordingly, a confidence score preferably indicates a degree of correlation between the user's needs at a particular time and place and the timeliness and demographics associated with the review. Other factors available particularly from blogs and social networks from which the reviews may be retrieved can also be applied, for example, to gauge the similarities between the user and the reviewer. Accordingly, user-targeted and concise summaries are generated by assigning confidence scores to the reviews retrieved.

In various additional embodiments of the methods of the present disclosure, to improve the reliability of the automated review summaries, a set of reviews is preferably retrieved 5 with meta-information that includes authorship information, and each sentence is then labeled with the authorship information in addition to aspect ratings 18 and associated confidence scores 20. Preferably, the authorship information includes at least a unique identifier for each author. As a result, reviews can be generated that:

are informative—achieve broad coverage of the input opinions,
  are concise and avoid redundancy,
  are readable and coherent (of high linguistic quality), and
  are targeted to the reader.

In addition, by including the authorship information, one of the weaknesses associated with automated summary reviews generated by a system is addressed; that is, how to determine whether the opinions contained therein are attributable to one or more human authors. For example, consider the following computer-generated review:
Delicious. Can't wait for my next trip to Buffalo.
GREAT WINGS.
I have rearranged business trips so that I could stop in and have a helping or two of their wings.
We were seated promptly and the staff was courteous.

It is not known whether the three sentences about wings reflect one (repeated) opinion from a single reviewer, or three opinions from three separate reviewers. By recording identifying authorship information with the text extracted from a review, subjective statements can be attributed to known sources, and can be used to enhance the trustworthiness and reliability of the automated summary reviews.

Figure 2:
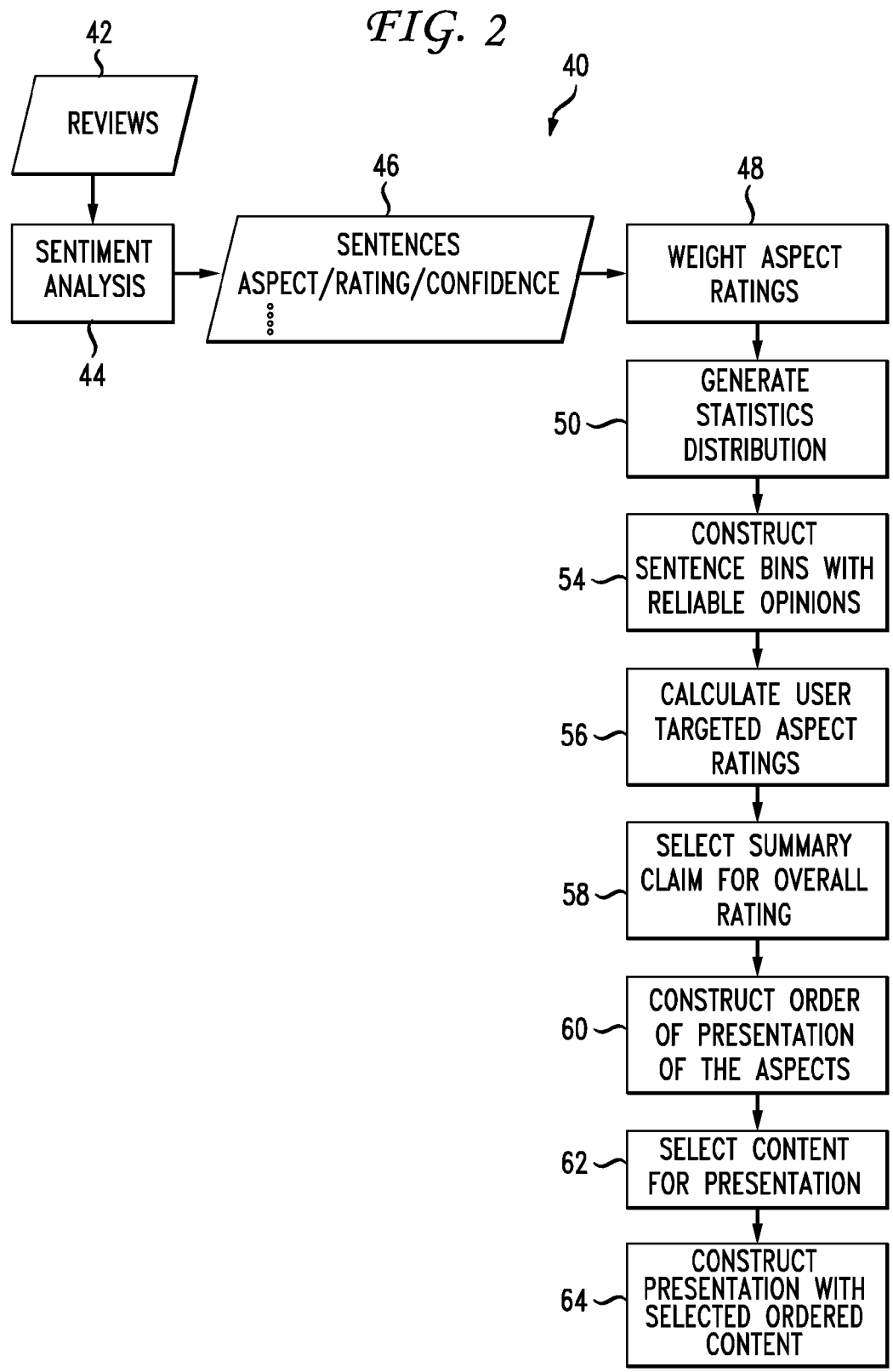
FIG. 2 is a schematic representation of an embodiment of a method for generating a summary review using a hybrid summarization technique of the present disclosure.

Referring to FIG. 2, a hybrid summarization method of reviews 40 is also provided to generate user-targeted, concise summary reviews from evaluative reviews 42 of an entity. A sentiment analysis can be performed according to various suitable methods known in the art, such as an MRMA model, to analyze sentences of a review in order to identify various aspects and predict and assign ratings, for example, on a scale of 1-5, for the aspects described in each sentence 44. A set of sentences 46 is then generated from each review, for example, using a sentence splitter, are classified according to aspect, and assigned an aspect rating determined from the sentiment analysis, and, preferably, a confidence rating according to various embodiments described herein.

In various embodiments, the assigned aspect ratings of sentences 46 are weighted with the confidence score 48 to generate a weighted aspect rating for each sentence. As described, the confidence score can be determined, for example, according to the timeliness of the review compared to the time the search was generated, the trustworthiness/reliability of the reviewer, the demographic similarity of the reviewer to the target reader, and/or other factors.

Referring still to FIG. 2, various statistics can then be generated 50. For example, for each aspect: a mean rating can be computed and a range of aspect ratings can be computed. In addition, an aspect rating distribution curve can be generated for a particular aspect of an entity according to means well-known in the art, for example, by summing the number of reviews or sentences associated with each possible aspect rating (for example, for aspect ratings assigned an integer between 1 and 5, the number of reviews associated with each integer 1, 2, 3, 4, and 5) for an entity. These statistics and distributions can optionally or additionally be generated using the weighted aspect ratios. It should be clear to one of ordinary skill in the art, that a rating distribution curve may skew positive or negative, may be normal, may be uniform, or may be bimodal. Aspects with positive ratings support recommendations and are concessions for disrecommendations. The opposite is true for aspects with negative ratings.

Still referring to FIG. 2, for each aspect, a sentence "bin" is also provided. The bin can be, for example, a list of quotable sentences extracted from the reviews and stored in a database, which are sorted or categorized by aspect (topic) and opinion polarity. The sentences 46 that are sorted into the sentence bins are those which will preferably be selected for presentation in the summaries, and preferably include all quotable sentences with evaluative content that is considered reliable. Sentences to which are assigned aspect ratings with a high confidence score, a score greater than a predetermined threshold value, for example, are considered reliable and are placed, or stored, into the sentence bin associated with that aspect 54. Such content with high confidence scores provides user-targeted information.

Not all sentences are quotable. For example, some reviewers tell stories about their experiences and the sentences in these stories do not stand alone. A quotable sentence is short (preferably including just a simple independent clause); mentions only one or two aspects; and is interesting (compare "The food was good," which will just restate the aspect rating summary statement, with "I particularly liked the chicken wings," which contains an example).

In various embodiments, machine learning techniques are used to train a binary classifier using ngram, part of speech and chunk features to identify quotable sentences. In additional embodiments, a similar feature set can be applied to classify aspects and determine opinion polarity for associating with each quote. Accordingly, while independent steps are shown in FIG. 2 for extraction and assignment of aspects and ratings to sentences (44, 46), determination of polarity (positive, negative, or neutral) of opinion (48, 50) and identification of quotable sentences for constructing sentence bins 54, one of skill in the art will appreciate that these steps are not necessarily independent. In additional embodiments, for example, various machine learning techniques can be applied in combination with natural language generation techniques, such that one or more of these steps are integrated.

Likewise, because the aspect ratings associated with the sentences sorted into the bins are associated with a high confidence score, these aspect ratings can be used to calculate user-targeted statistics 56, such as a user-targeted mean aspect rating associated with each aspect for each entity, or a user-targeted mean overall rating, which is calculated as the mean over all of the user-targeted aspect ratings for an entity. In various embodiments, the same statistics can be generated for the user-targeted weighted aspect ratings associated with the sentences in the bin.

Referring still to FIG. 2, generating a summary review of a particular entity for presentation preferably includes generating a summary claim for the entity 58, for example, "it is a great American food restaurant," strongly correlated with the overall user-targeted aspect ratings. The summary claim can be a statement constructed from a sentence in the review, or can be a statement extracted from a pre-generated list of available statements to generally recommend or disrecommend an entity, for example, "It is highly recommended." For example, if the overall rating for the entity is slightly positive (a rating of 4 of 5) or strongly positive (a rating of 5 of 5), a summary claim recommending (for a rating of 4) or strongly recommending (for a rating of 5) the entity, respectively, is preferably generated. If it is slightly negative (a rating of 2 of 5), or strongly negative (a rating of 1 of 5), a summary claim disrecommending or strongly disrecommending the entity, respectively, is preferably generated. If it is neither negative nor positive (a rating of 3), no summary claim recommending or disrecommending is generated, and, optionally, an overall opinion about the entity can be constructed that describes the overall rating distribution. In the case of a bimodal distribution with peaks skewing both positive and negative, the summary claim can be generated indicating that reviews were mixed.

Preferably following the summary claim, a review of the aspects is presented. In various embodiments, ordering models known in the art can be used to determine an order for presentation of the aspects. In the embodiment shown in FIG. 2, an order of selection for presentation of the aspects is constructed 60 based on the strength of the user-targeted (weighted) aspect ratings for the selected entity. Strong positive and strong negative opinions are preferably selected in the order of presentation before weaker opinions. If an aspect is controversial, however, in that it has a clear bimodal distribution curve, its mean rating may not accurately reflect the range of reviewers' opinions. In such cases, controversial aspects are preferred over noncontroversial weak opinion aspects, and such controversial aspects are preferably ordered in the presentation before weak opinion aspects. If there are comparatively few ratings for an aspect, the aspect is less preferred and is preferably positioned last in the presentation.

For each aspect in the aspect preference list chosen in step 60, a topical statement describing the distribution and polarity of ratings for the aspect can be constructed. The statement can be constructed from a pre-generated list of available sentences, or constructed from an opinion expressed in a review. For example, the following statement describes a favorable rating for price: "First, it has a great price." Content is then selected from the sentence bins constructed in step 54 to communicate about that aspect 62 in the summary review, preferably in accordance with the distribution curves generated for the aspects from the user-targeted aspect ratings 56, and corresponding polarities. The selected content for each aspect from the sentence bins constructed in step 54 can be labeled with that aspect's preference order.

The content can be selected for each aspect for presentation, in accordance with a predetermined order by defining rules for the selected presentation. For example, if an aspect skews positive, skews negative, or has a normal distribution curve, a topical sentence is constructed, for example, from a list of topical sentences, to communicate the distribution of ratings for that aspect and the predominant level of polarity. For example, "many reviewers thought . . .", or "some reviewers thought. . . ." A quote or quotes is then selected from the aspect's bin that is strongly correlated, for example, with the mean rating for the aspect for presentation in the aspect-rating summary. If there is already a quote in the content selected for presentation that addresses this aspect, the quote can be omitted.

If an aspect has a uniform distribution curve, a sentence can be constructed for presentation in the predetermined order indicating that there is no clear agreement among the reviewers about this aspect. The number of reviews and range of the aspect ratings can also or additionally be communicated.

If the aspect has a bimodal distribution curve, a sentence can be constructed for presentation in the predetermined order indicating that the opinions presented in the reviews are mixed, such as, "reviews about the service were mixed." Numbers or percent of ratings at each end of the curve can also be communicated. Preferably, a quote is also selected from the aspect's bin that is strongly correlated with each end of rating range for that aspect and presented in the aspect rating summary.

After the aspect ordering 60 and content selection 62, the generated presentation is then constructed 64, preferably with the predetermined order of presentation of aspects. In other embodiments, the preference order can be chosen in accordance with the most frequent order presented in the input reviews. Quotes can be set off by attribution statements such as "One reviewer commented" or "As Sally123 said" and linked to the corresponding input reviews. Additional rules can be applied to optimize the presentation, for example, for conciseness or informativeness.

Ordering Aspects and Polarities with Finite State Transducers

In one embodiment, weighted finite state transducers (WFST) are used to order the aspects and determine opinion polarities. WFSTs are described, for example, in Mehryar Mohri, Fernando Pereira, and Michael Riley, "Weighted automata in text and speech processing," IN ECAI-96 Workshop, pp. 46-50, *John Wiley and Sons* (1996), (hereinafter "Mohri"), which is incorporated herein by reference, to search large feature spaces and find optimal paths by using well-defined algebraic operations. More specifically, the "composition" operation that allows two WFSTs to be stochastically combined in order to extract the optimal sequence that maximizes the likelihood of the observed sequences is preferably applied to the ordering of the aspects. To find the optimal rendering order of the aspects to summarize, once content is selected 60, a WFST network is preferably created with all the possible permutations of the input sequence of the aspects and composes it with a larger WFST trained from bigram sequences of aspects extracted from the review corpus. The best path sequence is then derived from the composed WFST by applying the Viterbi decoding algorithm described in Mohri.

Figure 3A:
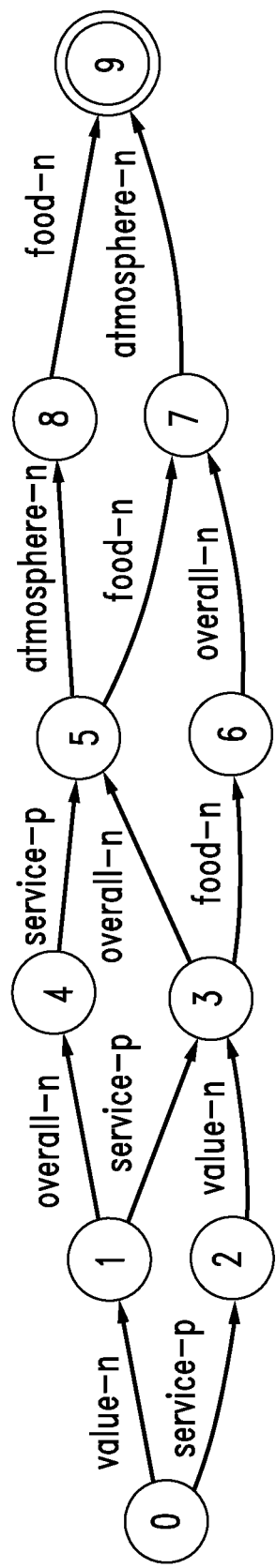
FIG. 3A is a schematic representation of an example of a weighted finite state transducer (WFST) representing permutations of possible sequences of aspects for use in determining an ordering of the aspects in accordance with embodiments of the present disclosure.
Figure 3B:
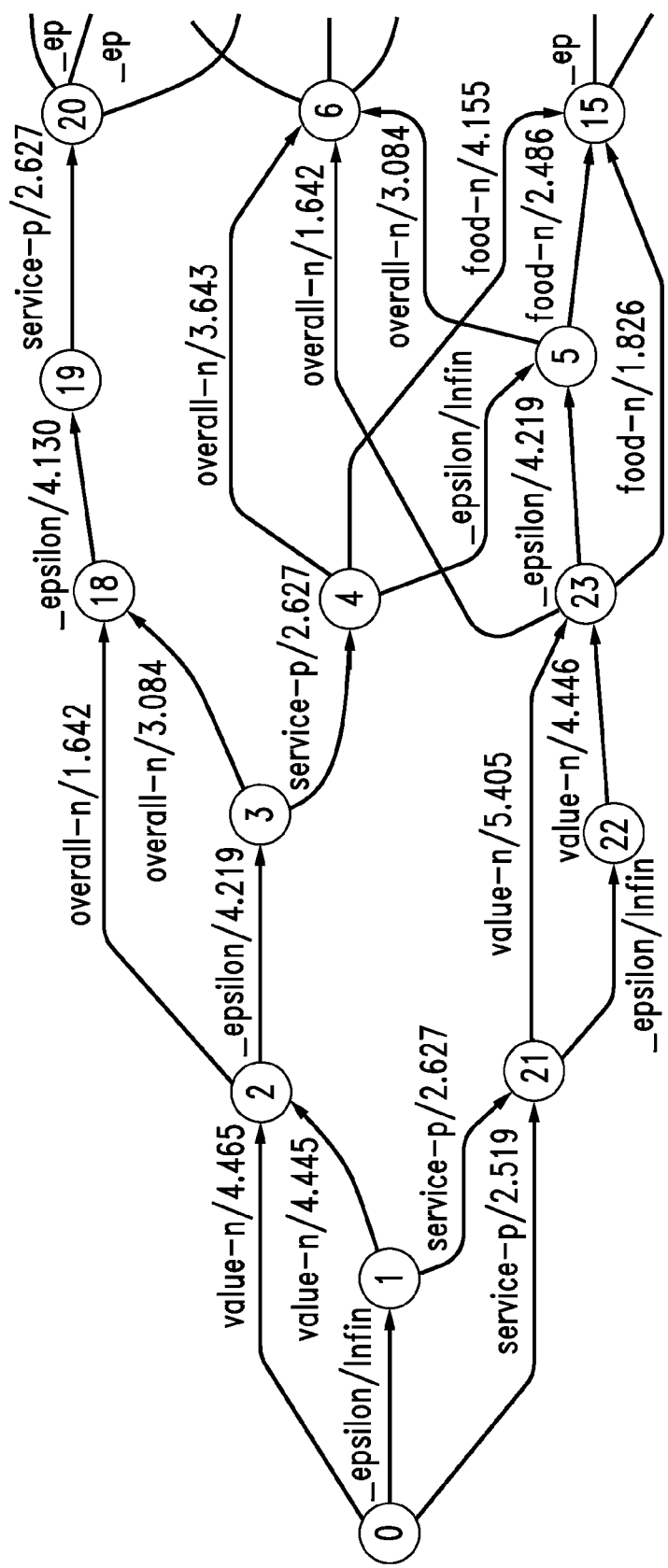
FIG. 3B is a network resulting from the permutation network of FIG. 3A fully composed with a larger, corpus-trained WFST.

For instance, the sequence of aspects and polarities represented by the string: value-n service-p overall-n food-n atmosphere-n is first permuted in all the different possible sequences and then converted into the WFST in FIG. 3A. Then the permutation network is fully composed with the larger, corpus-trained WFST resulting in the network in FIG. 3B. The best path is extracted by dynamic programming producing the optimal sequence service-p value-n overall n atmosphere-n food-n.

Selection of Quotable Sentences

Not all sentences are quotable. For example, some reviewers tell stories about their experiences and the sentences in these stories do not stand-alone. A quotable sentence is short (preferably, a simple independent clause), mentions only one or two aspects, and is interesting (compare "The food was good", which will just restate the aspect rating summary statement, with "I particularly liked the chicken wings", which contains an example). In various embodiments, an automatic method for identifying quotable selections from reviews is applied to select quotable sentences, for example to place in the sentence bins for use in either an abstractive summarizer or in embodiments of the hybrid summarizer.

A sentiment-laden quotable phrase can be described as a text fragment with the following characteristics:

Attribution—it is a phrase which is clearly ascribable to the author;

Length and structure—it is typically a relatively short phrase (between two and twenty words) which contains a statement with a simple syntactic structure and independent clauses;

Self-containment—it has a full meaning in a specific domain context and does not include pronominal references to entities outside its scope;

Opinion targets—it refers to opinion targets (i.e., aspects) in a specific domain; and Opinions and polarity—it has one or two opinion targets and an unambiguous overall polarity orientation.

For example, well-formed quotes for a restaurant could include:

Everyone goes out of their way to make sure you are happy with their service and food.

The stuffed mushrooms are the best I've ever had as was the lasagna.

Service is friendly and attentive even during the morning rush.

Examples of well-formed quotes for a hotel include:

I've never slept so well away from home loved the comfortable beds.

The price is high for sub standard mattresses when I pay this much for a room.

To automatically detect quotes from reviews, any suitable machine learning approach or machine learning approach known in the art, based on semi-automatically and manually labeled data, can be applied. The classification task consists of classifying both aspects and polarity for the most frequent aspects defined for each domain. Quotes for the aspect food, for instance, are split into positive and negative classification labels: food-p and food-n, respectively. A preferred model includes all the necessary discriminative features in one model, but other approaches with different levels of classification in a pipeline are also valid (e.g., a configuration with binary classification to detect quotable sentences followed by another classification model for aspect and polarity detection).

Evaluation of Review Summarizers

Evaluating an abstractive review summarizer, including the hybrid review summarizer presented here, involves measuring how accurately the opinion content present in the reviews is reflected in the summary and how understandable the generated content is to the reader. Traditional multi-document summarization evaluation techniques utilize both qualitative and quantitative metrics. The former require human subjects to rate different evaluative characteristics on a Likert-like scale, while the latter relies on automatic metrics such ROUGE, which is based on the common number of n-grams between a peer, and one or several gold-standard reference summaries.

To evaluate an embodiment of the hybrid summarizer, a qualitative metric approach was used to compare a known extractive summarizer using an open source MEAD system, with an embodiment of the present hybrid summarizer.

The Amazon Mechanical Turk crowdsourcing system was used to post a subjective evaluation task or HITs (Human Intelligence Tasks) for 20 restaurant summaries. Each HIT consists of one set of randomly ordered reviews referring to one restaurant and, four sets of randomly ordered summaries each one with a set of evaluation parameters with the following Likert-scale rating values: 1) Not at all; 2) Not very; 3) Somewhat; 4) Very; 5) Absolutely. To minimize reading ordering bias, both review and summaries are shuffled every time a page is visualized. Each participant was asked to rate the following four qualities: readability—a summary is readable if it is easy to read and understand; correctness—a summary is correct if it expresses the opinions in the reviews; completeness—a summary is complete if it captures the whole range of opinions in the reviews; compactness—a summary is compact if it does not repeat information. These categories are related to typical linguistic categories. For example, readability is related to whether the summary is grammatically correct with a consistent syntactic structure. Clarity, or easy to read relates to completeness. Correctness is connected to coverage, or the level of coverage for the aspects and the polarity expressed in the summary. Redundancy, the absence of unnecessary repetitions, is associated with compactness.

Five evaluations were requested for each summary to be done by different workers (also referred to as "turkers"). To increase the chances of getting accurate evaluations, only workers located in the USA with an approval rate of 90% or higher (e.g., turkers with a history of 90% or more approved HITs) participated. The task ran for two days and all results were received by the end of the second day. Manual examinations of the data did not show evidence of tampered data, but statistical analysis showed unusually widely spread data ranges. By looking at workers' activity reports, it was noticed that each worker only submitted a few HITs instead of completing the evaluation of the 20 summaries. Some workers commented that the evaluation scale and instructions were not clear. Accordingly, the evaluation was reopened, three additional workers were directly contacted, and the instructions and the evaluation scales were explained to them in detail. For consistency, these additional turkers were also asked to complete the evaluation for all 20 summaries. The analysis only included the five workers who had evaluated all 20 summaries. For each evaluation metric, the five workers evaluated each of the 20 summaries for a total of 100 ratings.

Qualitative evaluation results showed that the hybrid system was preferred for all categories: readability, correctness, completeness, and compactness. The following shows an example output of the MEAD summarization method and the hybrid summarization of the present disclosure for a single set of restaurant review documents.

MEAD:

A truly fun resturant everyone who like spicy food should try the rattoes and for a mixed drink the worm burner really good food and a fun place to meet your friends. We were attracted by the great big frog on the exterior of the building and the fun RAZZOO S logo during a trip to the mall. it was great the waitress was excellent very prompt and courteous and friendly to all a real complement to razzoo's way of service her name was Tabitha. The best spicy food restaurant with great server and fast service.

HYBRID:

Razzoo's Cajun Cafe in Concord, N.C. is an American restaurant. It has nine reviews. It had three very recent reviews. It is an awesome, American restaurant. It has many very positive reviews. First it has a great price. Angela Haithcock says "And such an awesome value for under 10". Second it has always exceptional service and for instance Danny Benson says "it was great the waitress was excellent very prompt and courteous and friendly to all a real complement to razzoo's way of service her name was Tabitha". Third it has an excellent atmosphere. Last it has amazing food. Scott Kern says "Some of the best food in the area".

Accordingly, the hybrid review summarizer delivers useful information, in a concise form that is particularly useful to mobile users, by providing both a natural language summary of the opinion distribution across the reviews and opinion fragments from the actual reviews.

FIG. 4 is a block diagram of an embodiment of a machine in the form of a computing system 100, within which a set of instructions 102, that when executed, may cause the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment. The machine may comprise a server computer, a client user computer, a personal computer (PC), a tablet PC, a personal digital assistant (PDA), a cellular telephone, a mobile device, a palmtop computer, a laptop computer, a desktop computer, a communication device, a personal trusted device, a web appliance, a network router, a switch or bridge, or any machine capable of executing a set of instructions (sequential or otherwise) that specify actions to be taken by that machine.

The computing system 100 may include a processing device(s) 104 (e.g., a central processing unit (CPU), a graphics processing unit (GPU), or both), program memory device(s) 106, and data memory device(s) 108, which communicate with each other via a bus 110. The computing system 100 may further include display device(s) 112 (e.g., liquid crystals display (LCD), a flat panel, a solid state display, or a cathode ray tube (CRT)). The computing system 100 may include input device(s) 146 (e.g., a keyboard), cursor control device(s) 116 (e.g., a mouse), disk drive unit(s) 118, signal generation device(s) 119 (e.g., a speaker or remote control), and network interface device(s) 124.

The disk drive unit(s) 118 may include machine-readable medium(s) 120, on which is stored one or more sets of instructions 102 (e.g., software) embodying any one or more of the methodologies or functions disclosed herein, including those methods illustrated herein. The instructions 81 may also reside, completely or at least partially, within the program memory device(s) 106, the data memory device(s) 108, and/or within the processing device(s) 104 during execution thereof by the computing system 100. The program memory device(s) 106 and the processing device(s) 104 may also constitute machine-readable media. Dedicated hardware implementations, not limited to application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

One embodiment contemplates a machine-readable medium or computer-readable device containing instructions 102, or that which receives and executes instructions 102 from a propagated signal so that a device connected to a network environment 122 can send or receive voice, video or data, and to communicate over the network 122 using the instructions 102. The instructions 102 may further be transmitted or received over a network 122 via the network interface device(s) 124. The machine-readable medium may also contain a data structure for storing data useful in providing a functional relationship between the data and a machine or computer in an illustrative embodiment of the disclosed systems and methods.

While the machine-readable medium 120 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the present embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

Although the present specification may describe components and functions implemented in the embodiments with reference to particular standards and protocols, the disclosed embodiments are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 31 C.F.R. §1.12(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

In one non-limiting, example embodiment, the computer-readable device can include a solid-state memory, such as a memory card or other package that houses one or more non-volatile read-only memories. Further, the computer-readable device can be a random access memory or other volatile re-writable memory. Additionally, the computer-readable device can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable device or a distribution medium and other equivalents and successor media, in which data or instructions may be stored.

In accordance with various embodiments, the methods, functions or logic described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods, functions or logic described herein.

It should also be noted that software which implements the disclosed methods, functions or logic may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. A method of generating a summary review associated with an entity, the method comprising:

generating, using a processing device, a distribution of aspect ratings, the aspect ratings being based on a plurality of textual opinions of a set of reviews by a reviewer, the set of reviews being associated with the entity, the aspect ratings being generated by the processing device as a numerical indication of polarity and strength of polarity associated with aspects represented in the plurality of textual opinions, each of the aspects representing a feature associated with the entity;

selecting, using the processing device, an opinion from the plurality of textual opinions, the opinion being selected based on the strength of polarity of an aspect rating that corresponds to the opinion relative to the distribution;

generating, using the processing device, the summary review in response to an inquiry from a user, the summary review comprising a summary statement and the opinion, the summary statement including textual data that indicates a characteristic of the polarity and the strength of polarity of the aspect ratings of the distribution, retrieving metadata associated with each of the set of reviews, and calculating a confidence score associated with each of the set of reviews based on the metadata, wherein the metadata includes demographic information for the reviewer and the user comprising age, sex, income and education of each, the opinion selected from the set of reviews being associated with a high confidence score, the high confidence score indicating the opinion includes information targeted to the user; and communicating and downloading the summary review, using a wireless network, to a mobile communication device in response to the inquiry from the user.

2. The method of claim 1, the set of reviews including a plurality of sentences, the summary review comprising a sentence extracted from the set of reviews, the sentence being selected from the plurality of sentences based on a quotable quality of the sentence.

3. The method of claim 1, further comprising defining a plurality of aspects representing a plurality of features associated with the entity, generating the distribution based on the polarity and the strength of polarity of aspect ratings associated with each of the plurality of aspects, selecting a plurality of opinions from the set of reviews based on the strength of polarity of aspect ratings corresponding to the plurality of textual opinions, the summary review comprising the plurality of opinions selected.

4. The method of claim 3, the plurality of opinions selected being presented in a predetermined order, the predetermined order being based on the strength of polarity associated with each of the plurality of aspects.

5. The method of claim 3, further comprising calculating an overall rating associated with the plurality of aspects based on the plurality of opinions selected, the summary review including a statement representing the overall rating associated with the entity.

6. The method of claim 1, wherein the metadata includes a time stamp to indicate timeliness, geographic location, and authorship information associated with the opinion.

7. A non-transitory computer-readable storage device storing instructions that, when executed by a processing device, cause the processing device to perform operations comprising:
   generating a distribution of aspect ratings, the aspect ratings being based on a plurality of textual opinions of a set of reviews by a reviewer, the set of reviews being associated with an entity, the aspect ratings being generated by the processing device as a numerical indication of polarity and strength of polarity associated with aspects represented in the plurality of textual opinions, each of the aspects representing a feature associated with the entity;
   selecting an opinion from the plurality of textual opinions, the opinion being selected based on the strength of polarity of an aspect rating that corresponds to the opinion relative to the distribution;
   generating a summary review in response to an inquiry from a user, the summary review comprising a summary statement and the opinion, the summary statement including textual data that indicates a characteristic of the polarity and the strength of polarity of the aspect ratings of the distribution, retrieving metadata associated with each of the set of reviews, and calculating a confidence score associated with each of the set of reviews based on the metadata, wherein the metadata includes demographic information for the reviewer and the user comprising age, sex, income and education of each, the opinion selected from the set of reviews being associated with a high confidence score, the high confidence score indicating the opinion includes information targeted to the user; and
   communicating and downloading the summary review, using a wireless communication network, to a mobile communication device in response to the inquiry from the user.

8. The non-transitory computer-readable storage device of claim 7, the set of reviews including a plurality of sentences, wherein the operations further comprise extracting a sentence from the set of reviews, the summary review comprising the sentence, the sentence being selected from the plurality of sentences based on a quotable quality of the sentences.

9. The non-transitory computer-readable storage device of claim 7, wherein the operations further comprise:
   generating the summary review associated with the entity by defining a plurality of aspects representing a plurality of features associated with the entity;
   generating the distribution based on the polarity and the strength of polarity of aspect ratings associated with each of the plurality of aspects; and
   selecting a plurality of opinions from the set of reviews based on the strength of polarity of aspect ratings corresponding to the plurality of textual opinions, the summary review comprising the plurality of opinions selected.

10. The non-transitory computer-readable storage device of claim 9, wherein the operations further comprise presenting the plurality of opinions selected in a predetermined order, the predetermined order being based on the strength of polarity associated with each of the plurality of aspects.

11. The non-transitory computer-readable storage device of claim 9, wherein the operations further comprise generating the summary review by calculating an overall rating associated with the plurality of aspects based on the plurality of opinions selected, the summary review including a statement representing the overall rating associated with the entity.

12. The non-transitory computer-readable storage device of claim 7, wherein the metadata includes a time stamp to indicate timeliness, geographic location, and authorship information associated with the opinion.

13. A system that generates a summary review associated with an entity, the system comprising:
   a mobile communication device;
   a processing device; and
   memory storing instructions that, when executed by the processing device, cause the processing device to perform operations comprising:
   generating a distribution of aspect ratings, the aspect ratings being based on a plurality of textual opinions of a set of reviews by a reviewer, the set of reviews being associated with the entity, the aspect ratings being generated by the processing device as a numerical indication of polarity and strength of polarity associated with aspects represented in the plurality of textual opinions, each of the aspects representing a feature associated with the entity;
   selecting an opinion from the plurality of textual opinions, the opinion being selected based on the strength of polarity of an aspect rating that corresponds to the opinion relative to the distribution;
   generating the summary review in response to an inquiry from a user, the summary review comprising a summary statement and the opinion, the summary statement including textual data that indicates a characteristic of the polarity and the strength of polarity of the aspect ratings of the distribution, retrieving metadata associated with each of the set of reviews, and calculating a confidence score associated with each of the set of reviews based on the metadata, wherein the metadata includes demographic information for the reviewer and the user comprising age, sex, income and education of each, the opinion selected from the set of reviews being associated with a high confidence score, the high confidence score indicating the opinion includes information targeted to the user; and
   communicating and downloading the summary review, using a wireless network, to a mobile communication device in response to the inquiry from the user.

14. The system of claim 13, the set of reviews including a plurality of sentences, wherein the summary review comprises a sentence extracted from the set of reviews, the sentence being selected from the plurality of sentences based on a quotable quality of the sentence.

15. The system of claim 13, wherein the operations further comprise:
   defining a plurality of aspects representing a plurality of features associated with the entity,
   generating the distribution based on the polarity and the strength of polarity of aspect ratings associated with each of a plurality of aspects representing a plurality of features associated with the entity; and
   selecting a plurality of opinions from the set of reviews based on the strength of polarity of aspect ratings corresponding to the plurality of textual opinions, the summary review comprising the plurality of the opinions selected.

16. The system of claim 15, wherein the operations further comprise presenting the plurality of opinions selected in a predetermined order, the predetermined order being based on the strength of polarity associated with each of the plurality of aspects.

17. The system of claim 15, wherein the operations further comprise calculating an overall rating associated with the plurality of aspects based on the plurality of opinions selected, the summary review including a statement representing the overall rating associated with the entity.

* * * * *